United States Patent [19]
Riley et al.

[11] 3,923,992
[45] Dec. 2, 1975

[54] ANALGETIC COMPOSITION AND METHOD OF USE

[75] Inventors: Thomas N. Riley, Oxford, Miss.; Danny B. Hale, Laverne, Tenn.

[73] Assignee: The University of Mississippi, University, Miss.

[22] Filed: May 23, 1974

[21] Appl. No.: 472,528

[52] U.S. Cl.............................. 424/267; 260/293.77
[51] Int. Cl.²........................................ A61K 31/445
[58] Field of Search................. 260/293.77; 424/267

[56] References Cited
OTHER PUBLICATIONS

Riley et al., Journal of Pharmaceutical Sciences, Vol. 62, No. 6, June 1973, pp. 983–986.

Culta, Handbook of Pharmacology, 4th Ed. (1969) pp. 624 and 643.

*Primary Examiner*—Stanley J. Friedman
*Attorney, Agent, or Firm*—William D. Stokes

[57] ABSTRACT

The compound 1-(2-phenylethyl)-3-methyl-4-(N-propananilido) piperidine. Narcotic analgetic compositions consisting of the compound 1-(2-phenylethyl)-3-methyl-4-(N-propananilido) piperidine, and said compound in admixture with a non-toxic pharmaceutically acceptable carrier. A method for raising the threshold of pain in mammals comprising administering a therapeutically effective concentration of 1-(2-phenylethyl) 3-methyl-4-(N-propananilido) piperidine preferably in admixture with a non-toxic pharmaceutically acceptable carrier.

2 Claims, No Drawings

ANALGETIC COMPOSITION AND METHOD OF USE

SUMMARY OF THE INVENTION

The invention comprises the compound having the formula:

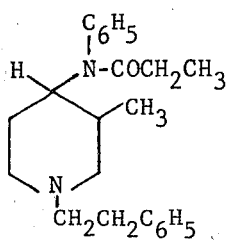

and the non-toxic, pharmaceutically acceptable inorganic and organic salts thereof. 1-(2-phenylethyl)-3-methyl-4-(N-propananilido) piperidine, possesses narcotic analgesic properties unexpectedly superior to the analgesic compounds and compositions heretofore known in the art.

BACKGROUND OF THE INVENTION

Derivatives of 4-propananilidopiperidine are known to possess analgesic properties. The 1-(2-phenylethyl) derivative commonly referred to as fentanyl in particular, has heretofore been known to be one of, if not the most potent of the synthetic narcotic analgetics. This compound is noted for its properties of rapid onset, short duration and effectiveness in small concentrations. While the pharmacological profile of fentanyl is very similar to other morphinomimetic compounds, it is a considerably more potent narcotic analgesic. This class of synthetic narcotic analgesics exhibits structural features also found in the acyclic basic anilide analgesics and the 4-phenyl-piperidine analgesics.

Studies of structure-activity relationships in the 4-anilidopiperidine class of compounds have consistently revealed that structural requirements for analgesic activity are similar to those established for both the acyclic basic anilides and the 4-phenylpiperidines. It is known that methylation of the piperidine ring of the 4-phenyl-piperidine analgesics (e.g. the prodines) results in changes in analgesic activity as compared with the base compound. Moreover, it is also known that the introduction of a methyl substituent on the alkylene chain of the acyclic basic anilides can provide, in some instances, compounds of higher analgesic activity than the base compound. Some of the methyl substitution patterns of the acyclic basic anilides have also been found to increase analgesic activity, e.g. 3-methylation and 2,5, and 3,5 dimethylation as compared with the activity of the base compound. Other methyl substitution patterns in this class, however, generally reduce analgesic activity. While these discoveries have been of interest, none of the methylated derivatives have revealed any outstanding activities or properties. More importantly, none of the methylated derivatives have possessed the degree of advantages and potency of the non-methylated fentanyl compound.

It was unexpectedly discovered that the new compound 1-(2-phenylethyl)-3-methyl-4-(N-propananilido)piperidine exhibits radically superior analgesic properties to any known analgetic compound.

DESCRIPTION OF THE INVENTION

It is known for the synthesis of 4-anilidopiperidines to proceed through the 1-substituted 4-piperidones intermediate with the formation of the Schiff base with aniline, followed by reduction and subsequent acylation of the 4-anilino moiety; however, in the preferred embodiment and as described herein, the compounds of the present invention and experimental compounds were prepared using 4-anilinopyridines intermediate formation. These key intermediates may be prepared in accordance with the known procedures via nucleophilic displacement of chloride by aniline from either the 4-chloropyridine N-oxide or 4-chloropyridine hydrochloride as shown in the following Scheme I:

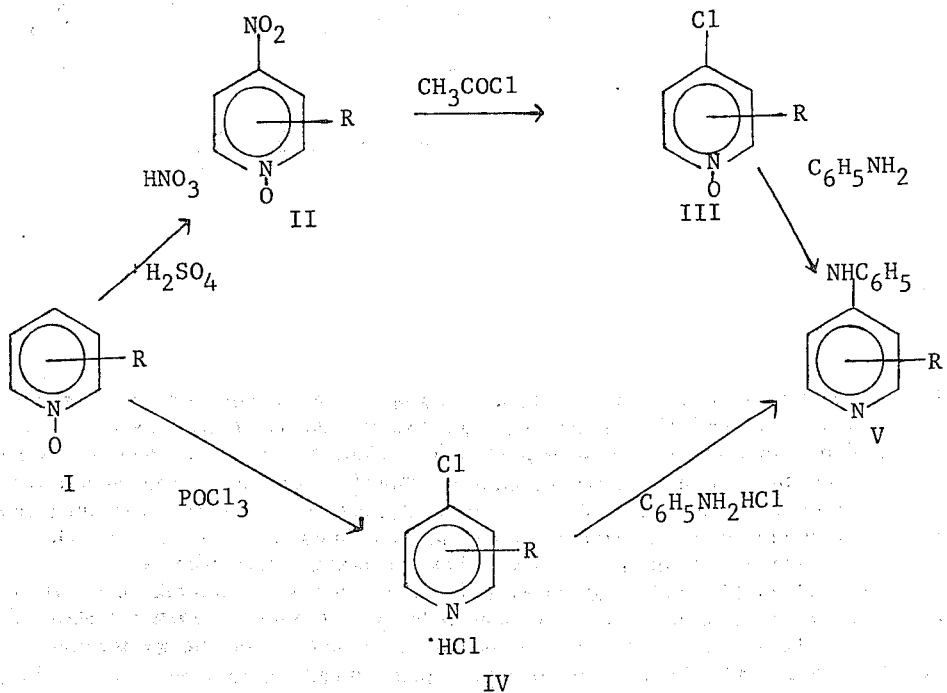

SCHEME I

Synthesis via the 4-chloropyridine hydrochloride compounds is the preferred route inasmuch as treatment of that compound with aniline hydrochloride resulted in higher yields of the 4-anilinopyridine. Scheme II sets out the steps in the synthesis of the inventive compound and the experimental compounds structurally related thereto. As illustrated in Scheme II, the propananilide compounds (VI) are obtained by heating the 4-anilinopyridine (V) in propionic anhydride. Hydrogenation of the pyridine ring is achieved using 10% palladium-on-charcoal in glacial acetic acid in a catalyst to compound ratio of 1:3. After hydrogenation, 1-benzyl-4-propananilido-piperidine (VII) is prepared by refluxing with benzyl bromide. The other experimental compounds, were then prepared by catalytic hydrogenolysis of the 1-benzyl derivative in the presence of phenylacetaldehyde (IX) (the inventive compound) or formaldehyde (VIII).

The salts can be formed by conventional techniques by reaction of the compounds with a therapeutically acceptable acid, such as citric acid or hydrochloric acid, with the hydrochloride salt capable of recrystallization from ethanol-ether.

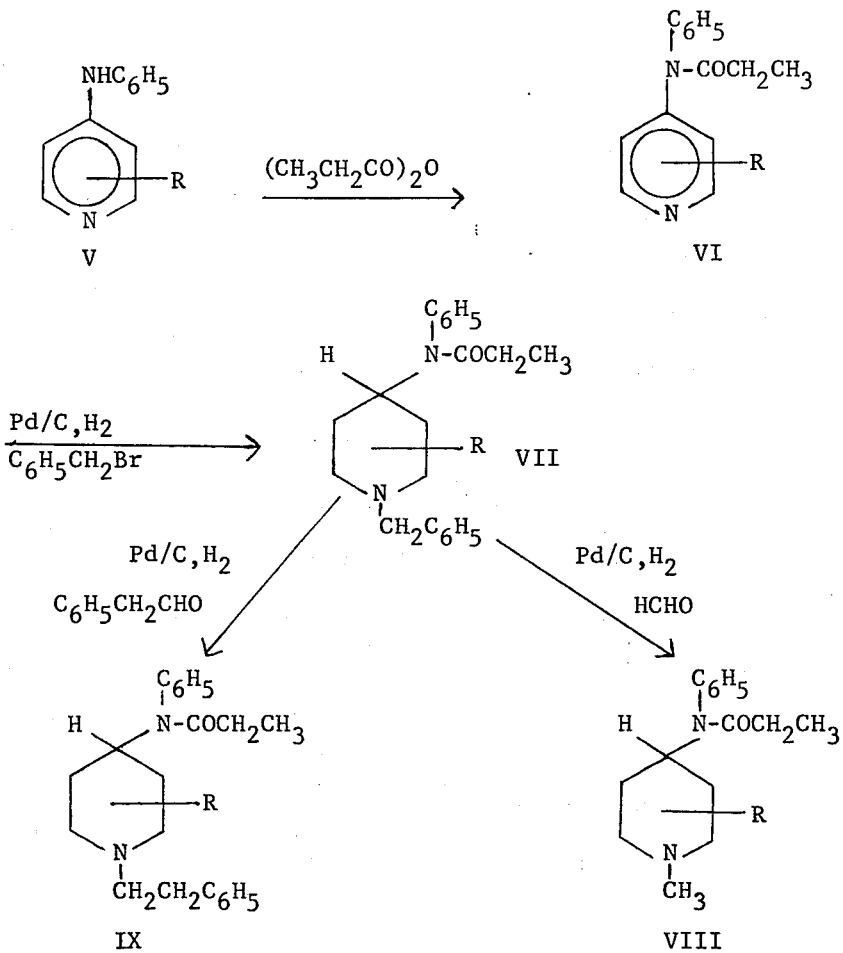

SCHEME II

It was unexpectedly discovered that the compound of the invention possesses potent narcotic analgesic properties including rapid onset and short duration, superior to any known analgesic. The composition of the invention possesses an unexpected degree of effectiveness and activity of the order of over 100 times greater than the most superior of prior art compounds, even those which are structurally similar thereto.

When employed to raise the threshold of pain in a mammal, animal or human, the active compound in a pharmaceutically acceptable carrier, is administered in a non-toxic dosage concentration sufficient to raise the threshold of the pain. The actual dosage administered will be determined by such generally recognized factors as the body weight of the patient, the severity of the condition being treated and the idiosyncrasies of the particular patient. With these factors in mind, the dosage unit for a particular patient can be readily determined by the medical practitioner in accordance with conventional techniques in the medicinal art.

For purposes of evaluation of analgesic potency the experimental compounds, including the compound of the invention, were converted to their water soluble, hydrochloride salts for parenteral injection. These dosage forms were then purified by standard procedures and used in the evaluation of analgesic potency. Immediately prior to injection of the experimental compounds into the test animals (rats), the hydrochloride salts were dissolved in a specific volume of normal saline (0.9% aqueous sodium chloride solution) to give the desired concentration of experimental compound. In certain cases it was necessary to make dilutions of the initial concentration of experimental compound in order to obtain the specific test concentration desired. All doses of the experimental compounds were administered by the parenteral route of administration via intraperitoneal injection. It will be appreciated that the compound of the invention may be also orally or rectally administered in a pharmaceutically-acceptable carrier, solid or liquid. Examples of acceptable solid carriers include, but are not limited to, starch, dextrose, sucrose, lactose, gelatin, agar, stearic acid, magnesium stearate, acacia and the like. Examples of liquids include, but are not limited to, water, edible oils, e.g., corn or peanut oil, and the like.

EXAMPLE 1

4-anilino-2-methylpyridine — A mixture of 8.2 g. (0.05 mole) of 4-chloro-2-methylpyridine hydrochloride [prepared by standard procedures by treatment of 2-methylpyridine N-oxide with phosphorus oxychloride] and 10.3 g. (0.08 mole) of aniline hydrochloride was placed in a sealed vessel and heated for 4 hr. at 130°. The resulting tarry material was purified by steam distillation. After 800 ml. of distillate had been collected, the residue was filtered and the filtrate was treated with charcoal and filtered through diatomaceous earth. The filtrate was extracted with chloroform and the chloroform was dried (sodium sulfate) and evaporated in vacuo, leaving 5.2 g. (56%) of 4-anilino-2-methylpyridine as white crystals, m.p. 146°–147°; NMR (CDCl$_3$): δ 8.40 (d, 1, C-6 H), 7.45–7.85 (m, 5, N—C$_6$H$_5$), 7.28 (s, 1, C-3 H), 7.20 (d, 1, C-5 H), 6.78 (broad s, 1, N—H), and 2.50 (s, 3, C-2 CH$_3$).

Anal.—Calc. for C$_{12}$H$_{12}$N$_2$: C, 78.26; H, 6.52; N, 15.22. Found: C, 78.21; H, 6.67; N, 14.64.

EXAMPLE 2

4-(N-propananilido-2-methylpyridine) — An 18.4 g. (0.10 mole) sample of 4-anilino-2-methylpyridine was dissolved in 100 ml. of propionic anhydride and heated at 80° for 12 hr. The excess propionic anhydride was removed in vacuo, and the dark residue was purified in 10 g. quantities by passage through a 1000 × 25-mm. chromatographic column packed with 190 g. of silica gel. Elution was carried out with ethyl acetate and 30 ml. fractions were collected. Fractions 11–20 were found to contain the product. This procedure gave 19.5 g. (81%) of 4-(N-propananilido)-2-methylpyridine as a light oil; NMR (CDCl$_3$); δ 8.40 (d, 1, C-6 H), 7.40–7.85 (m, 5, N—C$_6$H$_5$), 7.31 (s, 1, C-3 H), 7.25 (d, 1, C-5 H), 2.54 (s, 3, C-2 CH$_3$), 2.48 (m, 2, COCH$_2$CH$_3$), and 1.25 (t, 3, COCH$_2$CH$_3$). The hydrochloride salt was prepared by standard procedures and recrystallized from ethanol-ether, m.p. 152°.

Anal.—Calc. for C$_{15}$H$_{16}$N$_2$O . HCl: C, 65.10; H, 6.15; N, 10.13. Found: C, 64.91; H, 6.22; N, 9.64.

EXAMPLE 3

1-benzyl-2-methyl-4-(N-propananilido)piperidine — A 15.6 g. (0.064 mole) sample of 4-(N-propananilido)-2-methyl-pyridine was dissolved in 150 ml. of glacial acetic acid, and 4.0 g. of 10% palladium-on-charcoal was added to the solution. The mixture was hydrogenated for 24 hr. at 75°. The catalyst was removed by filtration, and the filtrate was carefully basified with sodium hydroxide and then extracted with chloroform. The chloroform extract was dried (sodium sulfate) and concentrated in vacuo, giving a viscous oil. This oil was dissolved in acetonitrile, and 13.3 g. (0.078 mole) of benzyl bromide was added. The solution was refluxed for 11 hr. followed by concentration in vacuo. The residual oil was taken up in a saturated solution of potassium carbonate and extracted with chloroform. The chloroform extract was dried (sodium sulfate) and concentrated in vacuo to yield a yellow oil, which was then passed through a 500 × 25-mm. chromatographic column packed with 90 g. of silica gel. Elution with ethyl acetate gave 10.5 g. (48%) of 1-benzyl-2 methyl-4(N-propananilido) piperidine as a clear oil; NMR (CDCl$_3$): δ 7.20–7.75 (m, 10, N—C$_6$H$_5$ and N—CH$_2$C$_6$H$_5$), 4.50–5.05 (m, 1, C-4 H), 3.15 and 4.33 (AB quartet, 2, N—CH$_2$C$_6$H$_5$), and 0.80–1.45 (m, 6, COCH$_2$CH$_3$ and C-2 CH$_3$). The picrate of 1-benzyl-2 methyl-4 (N-propananilido)piperidine was recrystallized from ethanol, m.p. 210°–212°.

Anal.—Calc. for C$_{22}$H$_{28}$N$_2$O.C$_6$H$_3$N$_3$O$_7$: C, 59.46; H, 5.50; N, 12.38. Found: C, 59.72; H, 5.40; N, 12.36.

EXAMPLE 4

1-(2-phenylethyl)-2-methyl-4-(N-propananilido)-piperidine — A 3.0 g. (0.009 mole) sample of 1-benzyl-2 methyl-4(N-propananilido) piperidine was mixed with 1.44 g. (0.012 mole) of phenylacetaldehyde and 0.5 g. of 10% palladium-on-charcoal in ethanol and hydrogenated for 4 hr. at room temperature. The reaction mixture was filtered and concentrated in vacuo, leaving a dark oil. The oil was purified by passing it through a 500 × 25-mm. chromatographic column packed with 90 g. of silica gel. Elution with ethyl acetate provided 2.24 g. (71%) of 1-(2-phenylethyl)-2-methyl-4-(N-propananilido)piperidine as an oil; NMR (CDCl$_3$): δ 7.20–7.85 (m, 10, N—C$_6$H$_5$ and N—CH$_2$CH$_2$C$_6$H$_5$), 4.33–4.80 (m, 1, C-4 H), and 0.80–1.50 (m, 6, COCH$_2$CH$_3$ and C-2 CH$_3$). The oil formed a picrate which was recrystallized from ethanol, m.p. 207°–208°.

Anal.—Calc. for C$_{23}$H$_{30}$N$_2$O.C$_6$H$_3$N$_3$O$_7$: C, 60.09; H, 5.74; N, 12.08. Found: C, 59.90; H, 5.75; N, 12.12.

EXAMPLE 5

1,2-dimethyl-4-(N-propananilido)piperidine — A mixture of 2.0 g. (0.006 mole) of 1-benzyl-2 methyl-4(N-propananilido) piperidine, 0.90 g. (0.01 mole) of 37% formaldehyde solution, and 0.5 g. of 10% palladium-on-charcoal was hydrogenated for 4 hr. The reaction mixture was filtered, concentrated in vacuo, and passed through a 250 × 20-mm chromatographic column packed with silica gel. Elution with ethyl acetate gave 1.2 g. (79%) of viscous oil; NMR (CDCl$_3$): δ 7.20–7.75 (m, 5, N—C$_6$H$_5$), 4.50–5.00 (m, 1, C-4 H), 2.07 (s, 3, N—CH$_3$), and 0.80–1.50 (m, 6, COCH$_2$CH$_3$ and C-2 CH$_3$). The oil formed a picrate which was recrystallized from ethanol, m.p. 194°–196.5°.

Anal.—Calc. for C$_{16}$H$_{24}$N$_2$O.C$_6$H$_3$N$_3$O$_7$: C, 53.98; H, 5.56; N, 14.31. Found: C, 54.00; H, 5.68; N, 14.76.

EXAMPLE 6

4-anilino-3-methylpyridine — A mixture of 7.2 g. (0.05 mole) of 4-chloro-3-methylpyridine N-oxide, prepared by standard procedures from the 4-nitro derivative (9), and 9.3 g. (0.10 mole) of aniline was heated in a sealed vessel at 130° for 4 hr. The deep-violet tar obtained from this procedure was purified as described in the synthesis of 4-anilino-2-methylpyridine, leaving a green crystalline solid which was recrystallized from ethanol-water (1:3) to yield 3.51 g. (38%) of product, m.p. 119°–120° [lit. (9) m.p. 122°].

4-(N-propananilido)-3-methylpyridine — A 20.3 g. (0.11 mole) sample of 4-anilino-3-methylpyridine dissolved in 100 ml. of propionic anhydride was stirred and heated at 80° for 12 hr. Purification by the procedure described for 4-(N-propananilido)-2-methylpyridine gave 21.1 g. (80%) of a light-yellow oil; NMR (CDCl$_3$): δ 8.63 (d, 1, C-6 H), 8.70 (s, 1, C-2 H), 7.55–7.80 (m, 5, N—C$_6$H$_5$), 7.35 (d, 1, C-5 H), 2.45 (m, 2, COCH$_2$CH$_3$), and 1.20 (t, 3, COCH$_2$CH$_3$). The hydrochloride salt of 4(N-propananilido)-3-methylpyridine was formed in the usual way and recrystallized from ethanol-ether, m.p. 136°–137°.

Anal.—Calc. for C$_{15}$H$_{16}$N$_2$O.HCl: C, 65.09; H, 6.15; N, 10.12. Found: C, 64.94; H, 6.25; N, 9.98.

EXAMPLE 7

1-benzyl-3-methyl-4-(N-propananilido)piperidine — A 9.6 g. (0.04 mole) sample of 4-(N-propananilido)-3-methylpyridine was dissolved in 100 ml. of glacial acetic acid, and 4.0 g. of 10% palladium-on-charcoal was added to the solution. The mixture was hydrogenated for 24 hr. at 75°. After filtration, basification, and concentration, the residual oil was refluxed with 11.9 g. (0.07 mole) of benzyl bromide in acetonitrile. The oil obtained by this procedure was purified as described for 1-benzyl-2 methyl-4(N-propananilido)piperidine, yielding 7.8 g. (58%) of 1-benzyl-3-methyl-4-(N-propananilido)piperidine as a clear oil; NMR (CDCl$_3$): δ 7.45 (s, 5, CH$_2$C$_6$H$_5$), 7.30–7.80 (m, 5, N—C$_6$H$_5$), 4.45–4.80 (m, 1, C-4 H), 3.55 (s, 2, N—CH$_2$C$_6$H$_5$), and 1.10 (d, 3, C-3 CH$_3$). The hydrochloride salt of 1-benzyl-3-methyl-4-(N-propananilido)piperidine was prepared and recrystallized from ethanol-ether, m.p. 202.5°–204°.

Anal.—Calc. for C$_{22}$H$_{28}$N$_2$O.HCl.H$_2$O: C, 67.59; H, 7.99; N, 7.17. Found: C, 67.83; H, 7.55; N, 7.02.

EXAMPLE 8

1-(2-phenylethyl)-3-methyl-4-(N-propananilido)piperidine— A 4.0 g. (0.012 mole) sample of 1-benzyl-3-methyl-4-(N-propananilido)piperidine was mixed with 1.0 g. (0.016 mole) of phenylacetaldehyde and treated according to the procedure described for the synthesis of 1-(2-phenylethyl)-2-methyl-4-(N-propananilido)piperidine, resulting in 3.32 g. (79%) of 1-(2-phenylethyl)-3-methyl-4-(N-propananilido)-piperidine, as a clear oil; NMR (CDCl$_3$): δ 7.42 (s, 5, N—CH$_2$CH$_2$C$_6$H$_5$), 7.30–7.77 (m, 5, N—C$_6$H$_5$), 4.40–4.80 (m, 1, C-4 H), and 1.10 (d, 3, C-3 CH$_3$). The hydrochloride salt of 1-(2-phenylethyl)-3-methyl-4-(N-propananilido)piperidine was prepared and recrystallized from ethanol-ether, m.p. 164°–166°.

Anal.—Calc. for C$_{23}$H$_{30}$N$_2$O.HCl: C, 71.38; H, 8.08; N, 7.24. Found: C, 71.01; H, 8.24; N, 6.95.

EXAMPLE 9

1,3-dimethyl-4-(N-propananilido)piperidine — A mixture of 4.0 g. (0.012 mole) of 1-benzyl-3-methyl-4-(N-propananilido) piperidine and 0.13 g. (0.015 mole) of formaldehyde solution (37%) was treated according to the procedure described in the preparation of 1,2-dimethyl-4-(N-propananilido) piperidine to yield 2.6 g. (82%) of 1,3-dimethyl-4-(N-propananilido)piperidine as a clear oil; NMR (CDCl$_3$): δ 7.10–7.65 (m, 5, N—C$_6$H$_5$), 4.24–4.75 (m, 1, C-4 H), 2.23 (s, 3, N—CH$_3$) and 1.10 (d, 3, C-3 CH$_3$). The picrate of 1,3-dimethyl-4-(N-propananilido) piperidine was prepared in the usual manner, m.p. 164°.

Anal.—Calc. for C$_{16}$H$_{24}$N$_2$O.C$_6$H$_3$N$_3$O$_7$: C, 53.98; H, 5.56; N, 14.31. Found: C, 54.04; H, 5.56; N, 14.73.

EXAMPLE 10

4-chloro-2,5-dimethylpyridine — A 154.5 g. (0.88 mole) sample of 2,5-dimethylpyridine N-oxide hydrochloride was prepared by standard procedures and added to 475 g. (3.10 moles) of phosphorus oxychloride. The reaction was heated to 120° for 1 hr. and then refluxed for 4 hr. The solution was allowed to cool and poured into ice. The solution was basified (potassium carbonate) and extracted with ether, and the ethereal extracts were dried (sodium sulfate) and concentrated in vacuo, leaving an impure liquid which was distilled at 40°–50° (1 mm.) to give 89.7 g. (72%) of 4-chloro-2,5,dimethylpyridine; NMR (CDCl$_3$): δ 8.60 (s, 1, C-6 H), 7.15 (s, 1, C-3 H), 2.50 (s, 3, CH$_3$), and 2.40 (s, 3, CH$_3$). The hydrochloride of 4-chloro-2,5,dimethylpyridine was prepared, m.p. 240°–241°.

Anal.—Calc. for C$_7$H$_8$ClN.HCl: C, 47.21; H, 5.09; N, 7.69. Found: C, 47.29; H, 5.55; N, 7.74.

EXAMPLE 11

4-anilino-2,5-dimethylpyridine — Following the procedure used to prepare 4-anilino-2-methylpyridine, 81.6 g. (0.63 mole) of aniline hydrochloride and 80.1 g. (0.45 mole) of 4-chloro-2,5,dimethylpyridine.HCl reacted to yield 4-anilino-2,5-dimethyl pyridine as a gray solid. Recrystallization from dioxane yielded 61.2 g. (49%) of a white solid, m.p. 145°; NMR (CDCl$_3$): δ 7.05–7.90 (m, 6, C-3 H and N—C$_6$H$_5$), 2.50 (s, 3, CH$_3$), and 2.40 (s, 3, CH$_3$).

Anal.—Calc. for C$_{13}$H$_{14}$N$_2$: C, 78.78; H, 7.07; N, 14.14. Found: C, 78.70; H, 7.15; N, 14.16.

EXAMPLE 12

4-(N-propananilido)-2,5-dimethylpyridine — A 29.7 g. (0.15 mole) sample of 4-anilino-2,5-dimethylpyridine was heated in 150 ml. of propionic anhydride for 12 hr. at 80°. The reaction was worked up as described for 4-(N-propananilido)-2-methylpyridine to give 31.7 g. (83%) of 4-(N-propananilido)-2,5-dimethylpyridine as an oil which solidified on standing at room temperature. Recrystallization of this solid from ether gave white crystals, m.p. 87°–89°; NMR (CDCl$_3$): δ 8.15 (s, 1, C-6 H), 7.20–7.55 (m, 5, N—C$_6$H$_5$), 7.13 (s, 1, C-3

H), 2.57 (s, 3, C-2 CH$_3$), 2.26 (s, 3, C-5 CH$_3$), 2.33 (m, 2, COCH$_2$CH$_3$) and 1.16 (t, 3, COCH$_2$CH$_3$).

Anal.—Calc. for C$_{16}$H$_{18}$N$_2$O: C, 75.79; H, 7.09; N, 11.02. Found: C, 75.53; H, 6.90; N, 10.77.

EXAMPLE 13

1-benzyl-4-(N-propananilido)-2,5-dimethylpiperidine — A solution of 10.1 g. (0.04 mole) of 4-(N-propananilido)-2,5-dimethylpyridine in 120 ml. of glacial acetic acid was hydrogenated and then treated with 8.5 g. (0.05 mole) of benzyl bromide, as previously described for the preparation of 1-benzyl-2-methyl-4(N-propananilido)piperidine to yield 7.3 g. (52%) of 1-benzyl-2,5-dimethyl-4-(N-propananilido) piperidine as a clear oil; NMR (CDCl$_3$): δ 7.20–7.75 (m, 10, N—C$_6$H$_5$ and N—CH$_2$C$_6$H$_5$), 4.30–4.75 (m, 1, C-4 H), 2.95–4.20 (AB quartet, 2,N—CH$_2$C$_6$H$_5$), and 0.80–1.40 (m, 9, C-2 CH$_3$, C-5 CH$_3$, and COCH$_2$CH$_3$). The oil formed a picrate which was recrystallized from ethanol, m.p. 209°–210°.

Anal.—Calc. for C$_{23}$H$_{30}$N$_2$O.C$_6$H$_3$N$_3$O$_7$: C, 60.09; H, 5.74; N, 12.08. Found: C, 59.71; H, 5.68; N, 11.81.

EXAMPLE 14

1-(2-phenylethyl)-2,5-dimethyl-4-(N-propananilido)piperidine— A solution of 1.0 g. (0.008 mole) of phenylacetaldehyde and 2.0 g. (0.006 mole) of 1-benzyl-2,5-dimethyl-4-(n-propananilido)piperidine was hydrogenated over 10% palladium-on-charcoal. The product was purified, as previously described in the preparation of 1-(2-phenylethyl)-2-methyl-4-(N-propananilido)piperidine, to provide 1.16 g. (53%) of 1-methyl-2,5-dimethyl-4-(N-propananilido)piperidine as a clear oil; NMR (CDCl$_3$): δ 7.35–7.75 (m, 10, N—C$_6$H$_5$ and N—CH$_2$CH$_2$C$_6$H$_5$), 4.30–4.75 (m, 1, C-4 H), and 0.80–1.40 (m, 9, C-2 CH$_3$, C-5 CH$_3$ and COCH$_2$CH$_3$). The oil formed a hydrochloride salt which was recrystallized from ethanol-ether, m.p. 235.5°–237°.

Anal.—Calc. for C$_{24}$H$_{32}$N$_2$O.HCl: C, 71.88; H, 8.30; N, 6.99. Found: C, 71.70; H, 8.24; N, 6.96.

EXAMPLE 15

4-(N-propananilido)-1,2,3-trimethylpiperidine — Two grams (0.006 mole) of 1-benzyl-2,5-dimethyl-4-(N-propananilido) piperidine and 0.9 g. (0.01 mole) of formaldehyde were hydrogenated. The product was purified, as previously described in the preparation of 1,2-dimethyl-4-(N-propananilido)piperidine, to yield 1.28 g. (78%) of 1-methyl-2,5-dimethyl-4-(N-propananilido)piperidine as a clear oil; NMR (CDCl$_3$): δ 7.20–7.75 (m, 5, N C$_6$H$_5$), 4.30–4.75 (m, 1, C-5 H), 2.07 (s, 3, N—CH$_3$), and 0.80–1.40 (m, 9, C-2 CH$_3$, C-5 CH$_3$ and COCH$_2$CH$_3$). The oil formed a picrate which was recrystallized from ethanol, m.p. 242°–244°.

Anal.—Calc. for C$_{17}$H$_{26}$N$_2$O.C$_6$H$_3$N$_3$O$_7$: C, 54.86; H, 5.81; N, 13.91. Found: C, 55.21; H, 5.95; N, 14.13.

ANALGESIC ACTIVITY

Analgesia is the state of raising the threshold of pain. The pain threshold may be defined as the lowest perceptible intensity of pain, and is induced by a stimulus. The latter may serve as a measure of the variations of the pain threshold. If more stimulus is required the threshold of pain is said to be raised. If less stimulus is needed the pain threshold is said to be lowered. The analgesic activity of the ring-methylated 4-anilidopiperidines compound of the invention was determined in rats by the D'Amour-Smith tail flick method. In the method of D'Amour and Smith, a strong light is focused on the tip of a rat's tail. Pain is indicated by a sudden typical switching of the tail. The pain threshold in a large group of patients of different ages and both sexes has been shown to deviate less than one percent. The ring methylated 4-anilidopiperidine compounds tested and compared with the inventive compound were tested as the hydrochloride salts and were dissolved in normal saline immediately prior to intraperitoneal injection. The ED$_{50}$ value for the compound tested is defined as the dose of the drug which in 50% of the animals tested, increased the reaction time by 50% at 40 minutes post injection. Compounds were deemed inactive if the rats did not exhibit significant analgesia at dose levels of 100 mg/kg.

Table I reports the analgesic activity of the compounds tested and results obtained and known in the art for other known analgetics. Groups of eight rats were utilized for each dosage unit of the drug. A minimum of three doses per drug were tested on each rat. Three response times were recorded for each rat prior to injection and then every 20 minutes for two hours thereafter. In the calculation of results, the first control was discarded.

TABLE I

| ANALGETIC ACTIVITY | |
| --- | --- |
| | ED$_{50}$, mg/kg |
| Methylated 4-propananilidopiperidine | |
| 1-methyl, 2-methyl | Inactive |
| 1-methyl, 3-methyl | 14.34 |
| 1-methyl, 2,5-dimethyl | Inactive |
| 1-benzyl, 2-methyl | Inactive |
| 1-benzyl, 3-methyl | 36.67 |
| 1-benzyl, 2,5-dimethyl | 65.14 |
| 1-(2-phenylethyl), 2-methyl | 0.665 |
| 1-(2-phenylethyl), 3-methyl | 0.004 |
| 1-(2-phenylethyl), 2,5-dimethyl | 0.803 |
| 1-(2-phenylethyl)-4-propananilido-piperidine (fentanyl) | 0.04 |
| Methylated 4-phenylpiperidines | |
| 3-methyl, 1-methyl | 2.0 – 5.8[3] |
| 2,3-dimethyl | Non available |
| 2,5-dimethyl, 1-methyl | 0.75 – 1.0[2] |
| 3,5-dimethyl, 1-methyl | 12.57[1] |
| 1-(2-phenylethyl), 2-methyl | 15.00[2] |
| Meperidine | 28.8 mg/kg[1] |
| Morphine | 5.44 mg/kg[1] |
| Diampromide | 3.7[4] |
| Phenampromide | 13.5[5] |

[1] P.S. Portoghese, Z, Gomaa, D.L. Larson, J. Med. Chem., 16, 199 (1973).
[2] A.H. Beckett and A.F. Casy, Prog. in Med. Chem., 2, 43 (1962).
[3] R.A. Hardy and M.G. Howell in "Analgetics," G. deStevens, Ed., Academic Press, New York, 1965, p. 202.
[4] P.S. Portoghese and T.N. Riley, J. Pharm. Sci., 54, 1831 (1965).
[5] W.B. Wright, H.J. Brabander and R.A. Hardy, J. Org. Chem., 26, 476 (1961).

It will be appreciated even from a cursory examination of the test results and comparative data that the compound of the invention, 1-(2-phenylethyl)-3-methyl-4-(N-propananilido) piperidine exhibits a minimum 100 times greater activity than the most potent of the known analgesics, a degree of effectiveness totally unobvious, unexpected and unpredictable from the activity of structurally similar compounds. The LD$_{50}$ of the inventive compound is 15–18 mg/Kg determined in mice by intraperitoneal injection.

We claim:

1. The analgetic composition consisting essentially of the compound 1-(2-phenylethyl)-3-methyl-4-(N-propananilido)piperidine in admixture with a non-toxic pharmaceutically acceptable carrier, said compound being in a therapeutically effective concentration.

2. A process for raising the threshold of pain in mammal which consists essentially of administering to said mammal a composition consisting of the compound 1-(2-phenylethyl)-3-methyl-4-(N-propananilido)piperidine in admixture with a non-toxic pharmaceutically acceptable carrier, said compound being in a therapeutically effective concentration.

* * * * *